United States Patent
Hsu et al.

(10) Patent No.: US 10,620,521 B2
(45) Date of Patent: Apr. 14, 2020

(54) ADJUSTMENT MECHANISM AND PROJECTION DEVICE

(71) Applicant: Coretronic Corporation, Hsin-Chu (TW)

(72) Inventors: Ting-Jung Hsu, Hsin-Chu (TW); Chien-Chi Shen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/286,611

(22) Filed: Feb. 27, 2019

(65) Prior Publication Data
US 2019/0331996 A1  Oct. 31, 2019

(30) Foreign Application Priority Data
Apr. 28, 2018 (CN) .................... 2018 2 0635643 U (51) Int. Cl.
*G03B 21/20* (2006.01)

(52) U.S. Cl.
CPC .................. *G03B 21/208* (2013.01)

(58) Field of Classification Search
CPC .... G03B 21/28; G03B 21/145; G03B 21/208; G03B 21/2013; G03B 21/2033; G03B 21/2053; G03B 21/2066; H04N 9/315; H04N 9/3141; H04N 9/3155; H04N 9/3161; H04N 9/3164
See application file for complete search history.

(56) References Cited

U.S. PATENT DOCUMENTS

| | | | |
|---|---|---|---|
| 2009/0262315 A1* | 10/2009 | Tseng | G03B 21/14 353/119 |
| 2009/0296051 A1* | 12/2009 | Huang | G03B 27/547 353/122 |

FOREIGN PATENT DOCUMENTS

TW  I304895 B  1/2009

* cited by examiner

*Primary Examiner* — Sultan Chowdhury (57) ABSTRACT

An adjustment mechanism configured to fix and adjust a light integration rod including an outer cylinder member, an inner cylinder member and a first adjustment member. The outer cylinder member has a first open end, a second open end and a cylinder wall, wherein the cylinder wall has a first opening and a first locking portion protruding outward. The inner cylinder member is configured to accommodate the light integration rod. The inner cylinder member is disposed in the outer cylinder member, a first outer surface of the inner cylinder member has a first protruding portion, wherein the first protruding portion passes through the first opening and protrudes from the outer cylinder member, and is opposite to the first locking portion. The first adjustment member is connected to the first locking portion and the first protruding portion, and configured to move the inner cylinder member back and forth.

14 Claims, 8 Drawing Sheets

ADJUSTMENT MECHANISM AND PROJECTION DEVICE

CROSS-REFERENCE TO RELATED APPLICATION

This application claims the priority benefit of China application CN201820635643.7, filed on 2018 Apr. 28. The entirety of the above-mentioned patent application is hereby incorporated by reference herein and made a part of this specification.

FIELD OF THE INVENTION

The invention relates to an adjustment mechanism of an optical element, and more particularly to an adjustment mechanism of a light integration rod and a projection device using the same.

BACKGROUND OF THE INVENTION

In the conventional projection device, an illumination light beam provided by a light source is usually homogenized by a light integration rod, and then the illumination light beam is reflected by a reflective mirror to a light valve, and a light spot is formed on the light valve. In general, in order to have preferred light utilization efficiency, it is generally desirable to have the light spot just entirely cover an active area of the light valve and focus on the active area. However, due to different reflection optical paths, tolerances of the finished molds, or tolerances during assembling, the light spot formed on the light valve sometimes fails to focus on the active area, and the edge of the light spot diverges, resulting in poor light utilization efficiency.

The information disclosed in this "BACKGROUND OF THE INVENTION" section is only for enhancement understanding of the background of the invention and therefore it may contain information that does not form the prior art that is already conventional to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an adjustment mechanism, which is adapted to fix and adjust the light integration rod to enhance the light utilization efficiency.

The invention provides a projection device, which can adjust the light integration rod to enhance the light utilization efficiency.

Other advantages and objects of the invention may be further illustrated by the technical features broadly embodied and described as follows.

In order to achieve one or a portion of or all of the objects or other objects, an adjustment mechanism provided in an embodiment of the invention is configured to fix and adjust a light integration rod. The adjustment mechanism includes an outer cylinder member, an inner cylinder member and a first adjustment member. The outer cylinder member has a first open end and a second open end opposite to the first open end and a cylinder wall extending between the first open end and the second open end, wherein the cylinder wall has a first opening and a first locking portion protruding outward, the first locking portion and the first opening are arranged in a first direction from the first opening end to the second opening end. The inner cylinder member is configured to accommodate the light integration rod. The inner cylinder member is disposed in the outer cylinder member, a first outer surface of the inner cylinder member has a first protruding portion, the first protruding portion passes through the first opening and protrudes from the outer cylinder member, and is opposite to the first locking portion. The first adjustment member is connected to the first locking portion and the first protruding portion, and configured to move the inner cylinder member back and forth along the first direction.

In order to achieve one or a portion of or all of the objects or other objects, a projection device provided in an embodiment of the invention includes a light integration rod module, a light source, a light valve and a projection lens. The light integration rod module includes a light integration rod and an adjustment mechanism. The adjustment mechanism is configured to fix and adjust the light integration rod. The adjustment mechanism includes an outer cylinder member, an inner cylinder member and a first adjustment member. The outer cylinder member has a first open end and a second open end opposite to each other and a cylinder wall extending between the first open end and the second open end, the cylinder wall has a first opening and a first locking portion protruding outward, in which the first locking portion and the first opening are arranged in a first direction from the first opening end to the second opening end. The inner cylinder member is configured to accommodate the light integration rod. The inner cylinder member is disposed in the outer cylinder member, and a first outer surface of the inner cylinder member has a first protruding portion, the first protruding portion passes through the first opening and protrudes from the outer cylinder member, and is opposite to the first locking portion. The first adjustment member connects the first locking portion and the first protruding portion, and is configured to move the inner cylinder member back and forth along the first direction. The light source provides an illumination light beam to pass through the light integration rod. The light valve is disposed on the transmission path of the illumination light beam and is adapted to convert the illumination light beam into an image light beam. The projection lens is disposed on the transmission path of the image light beam and is configured to project the image light beam out of the projection device.

The inner cylinder member of the adjusting mechanism of the embodiment of the invention is configured to accommodate the light integration rod and is disposed in the outer cylinder member. The first adjustment member is connected to the first locking portion of the outer cylinder member and the first protruding portion of the inner cylinder member. By adjusting the first adjustment member, the inner cylinder member and the light integrating rod accommodated therein can move back and forth along the first direction, so that the light spot can be focused on the active area of the light valve to reduce the blurring of the edge of the light spot, thereby enhancing light utilization efficiency. The projection device of the embodiment of the invention has the advantage of better light utilization efficiency due to the use of the aforementioned adjustment mechanism.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
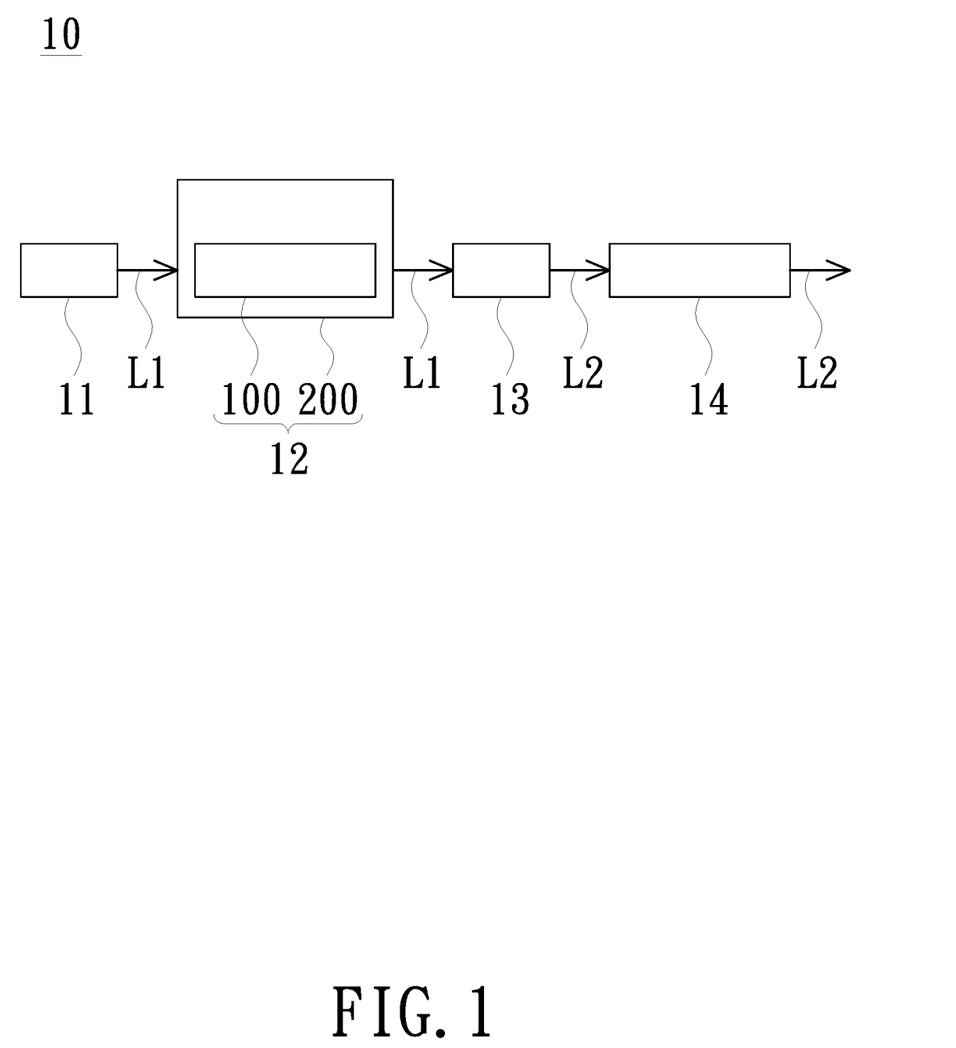
FIG. 1 is a schematic block diagram of a projection device of one embodiment of the invention.

FIG. 1 is a schematic block diagram of a projection device of one embodiment of the invention. Referring to FIG. 1, the projection device 10 of the embodiment includes a light source 11, a light integration rod module 12, a light valve 13, and a projection lens 14. The light integration rod module 12 includes a light integration rod 100 and an adjustment mechanism 200. The adjustment mechanism 200 is configured to fix and adjust the light integration rod 100. The light source 11 provides an illumination light beam L1 to pass through the light integration rod 100. The light valve 13 is disposed on a transmission path of the illumination light beam L1 and is adapted to convert the illumination light beam L1 into an image light beam L2. The projection lens 14 is disposed on a transmission path of the image light beam L2 and is configured to project the image light beam L2 out of the projection device 10. The illumination light beam L1 can be white light or divided into multiple color lights according to a time sequence. The projection device 10 may further include a color wheel (not shown) to divide the illumination light beam L1 into a red light beam, a green light beam and a blue light beam according to a time sequence. The light valve 13 may be a transmissive light valve or a reflective light valve, wherein the transmissive light valve may be a liquid crystal display panel, and the reflective light valve may be a digital micro-mirror device (DMD) or a liquid crystal on silicon panel (LCoS panel). The quantity of light valves 13 may be one or more depending on the design. Hereinafter, the detailed structure and implementation of the adjustment mechanism 200 of the projection device 10 will be further described.

Figure 2:
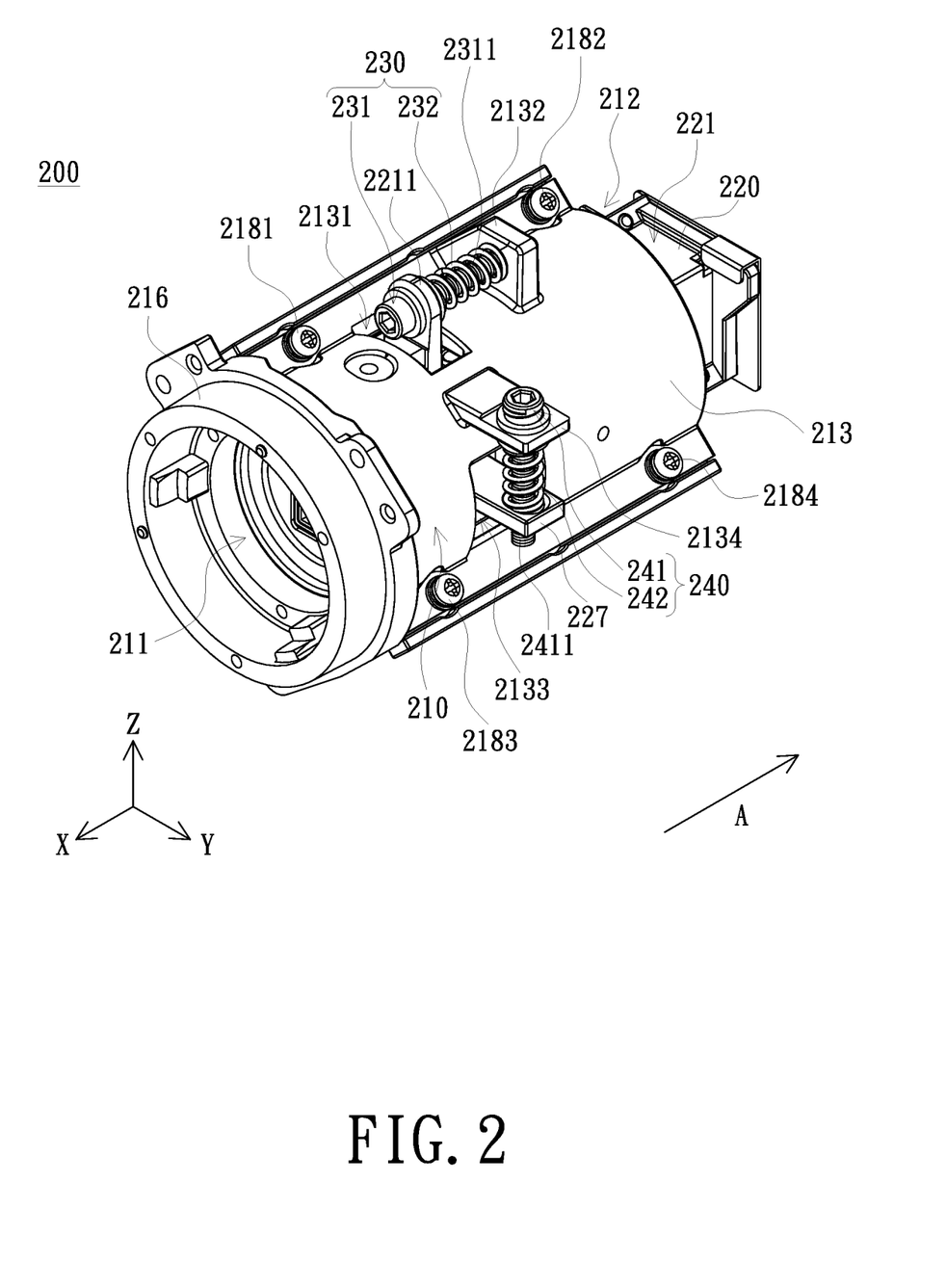
FIG. 2 is a schematic perspective view of an adjustment mechanism and a light integration rod of one embodiment of the invention.
Figure 3:
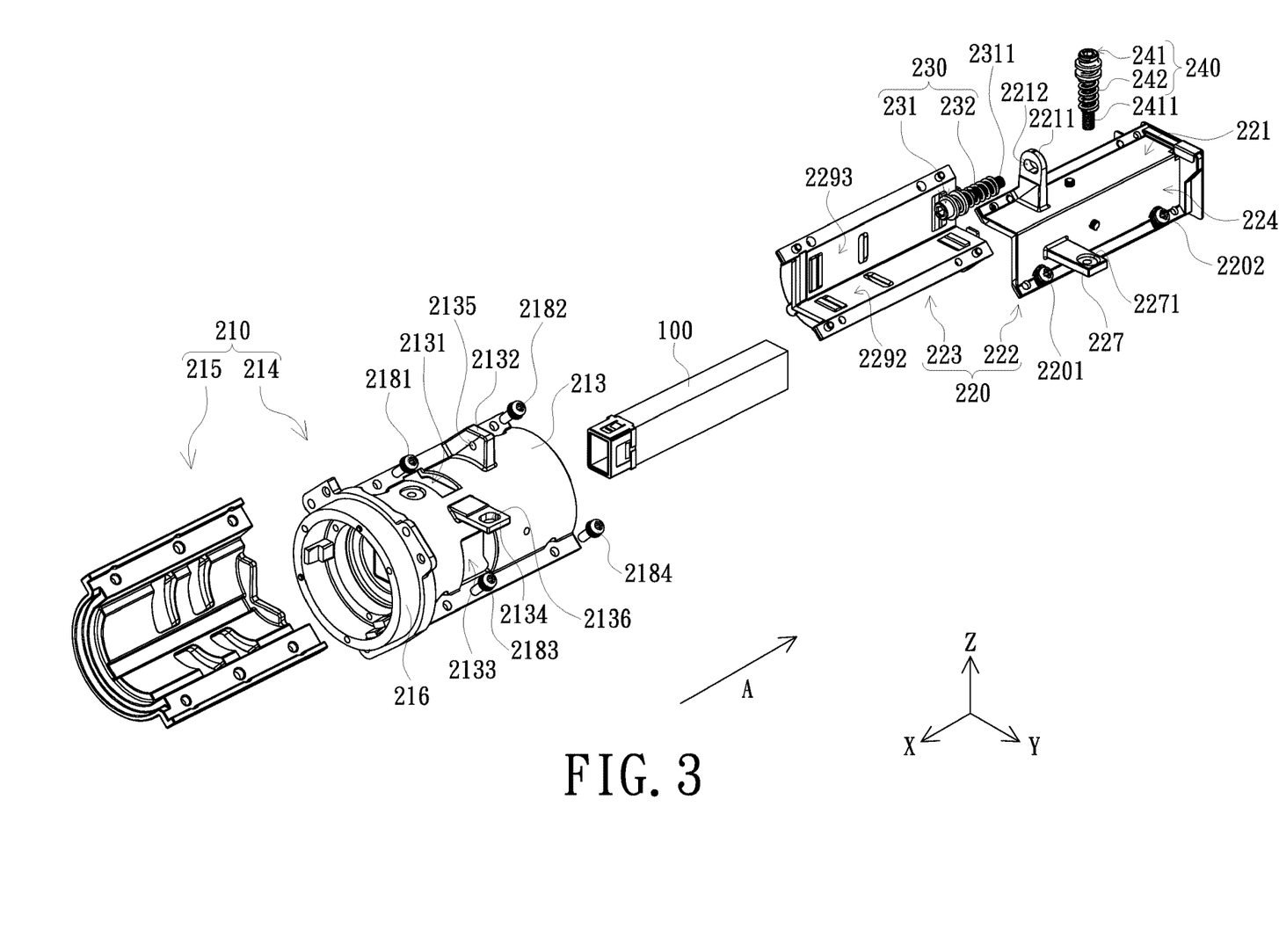
FIG. 3 is a schematic exploded view of FIG. 2.

FIG. 2 is a schematic perspective view of an adjustment mechanism and a light integration rod of one embodiment of the invention. FIG. 3 is a schematic exploded view of FIG. 2. Referring to FIG. 2 and FIG. 3, the adjustment mechanism 200 of the embodiment includes an outer cylinder member 210, an inner cylinder member 220 and a first adjustment member 230. The outer cylinder member 210 has a first open end 211 and a second open end 212 opposite to each other and a cylinder wall 213 extending between the first open end 211 and the second open end 212, the cylinder wall 213 has a first opening 2131 and a first locking portion 2132 protruding outward, wherein the first locking portion 2132 and the first opening 2131 are arranged in a first direction A from the first opening end 211 to the second opening end 212. The inner cylinder member 220 is configured to accommodate the light integration rod 100. The inner cylinder member 220 is disposed in the outer cylinder member 210, and a first outer surface 221 of the inner cylinder member 220 has a first protruding portion 2211, the first protruding portion 2211 passes through the first opening 2131 and protrudes from the outer cylinder member 210, and is opposite to the first locking portion 2132. The first adjustment member 230 connects the first locking portion 2132 and the first protruding portion 2211, and is configured to move the inner cylinder member 220 back and forth along the first direction A within a predetermined distance, for example. There is, for example, a gap between the first opening 2131 and the first protruding portion 2211, and the gap allows the first protruding portion 2211 to move back and forth along the first direction A within a predetermined distance. The predetermined distance is, for example, 2 mm, but is not limited thereto.

The outer cylinder member 210 includes, for example, a top cover 214, a bottom cover 215, and a plurality of screws 2181, 2182, 2183, and 2184. The top cover 214 has a ring portion 216 at the first open end 211. The screws 2181, 2182, 2183, and 2184 are fixed to combine the top cover 214 and the bottom cover 215 to form a first accommodating space between the top cover 214 and the bottom cover 215, and the inner cylinder member 220 is disposed in the first accommodating space. In another embodiment, the outer cylinder member 210 can also be an integrally formed component.

The inner cylinder member 220 includes, for example, a top cover 222, a bottom cover 223, and a plurality of screws 2201, 2202. The screws 2201 and 2202 are configured to combine the top cover 222 and the bottom cover 223 to form a second accommodating space, and the light integration rod 100 is accommodated in the second accommodating space. In another embodiment, the inner cylinder member 220 can also be an integrally formed component.

The first adjustment member 230 may include, but not limited to, an adjusting screw 231 and a spring 232, the first protruding portion 2211 may include, but not limited to, an adjusting hole 2212, and the first locking portion 2132 may include, but not limited to, a screw hole 2135. The spring 232 is sleeved on a rod portion 2311 of the adjusting screw 231. The rod portion 2311 passes through the adjusting hole 2212 of the first protruding portion 2211 and is fixed to the screw hole 2135 of the first locking portion 2132. Specifically, the spring 232 surrounds the rod portion 2311 of the adjusting screw 231 and abuts between the first protruding portion 2211 and the first locking portion 2132. Regarding the manner in which the first adjustment member 230 moves relative to the inner cylinder member 220, in the embodiment, the adjusting screw 231 can be rotated in a rotating direction (for example, clockwise direction) to cause the first protruding portion 2211 to drive the inner cylinder member 220 to move along the first direction A toward the first locking portion 2132 (i.e., moves forward along the first direction A), and causes the spring 232 to be in a compressed state. Or, the adjusting screw 231 is rotated in another rotational direction (for example, counterclockwise direction) to gradually release the spring 232 in the compressed state, and the spring 232 pushes the first protruding portion 2211 to cause the first protruding portion 2211 to drive the inner cylinder member 220 to move in the opposite direction of the first direction A away from the first locking portion 2132 (i.e., moves backward along the opposite direction of the first direction A).

By adjusting the first adjustment member 230 of the adjustment mechanism 200 of the embodiment, the inner cylinder member 220 and the light integration rod 100 accommodated therein can move back and forth along the first direction A, so that the light spot can be focused on the active area of the light valve 13 to reduce the problem of blurring of the edge of the light spot caused by conventional projection devices due to production tolerances, thereby enhancing light utilization efficiency. In an embodiment, by the back and forth movement of the light integration rod 100, the focal length can be adjusted within a range of, for example, 2 mm.

Figure 4:
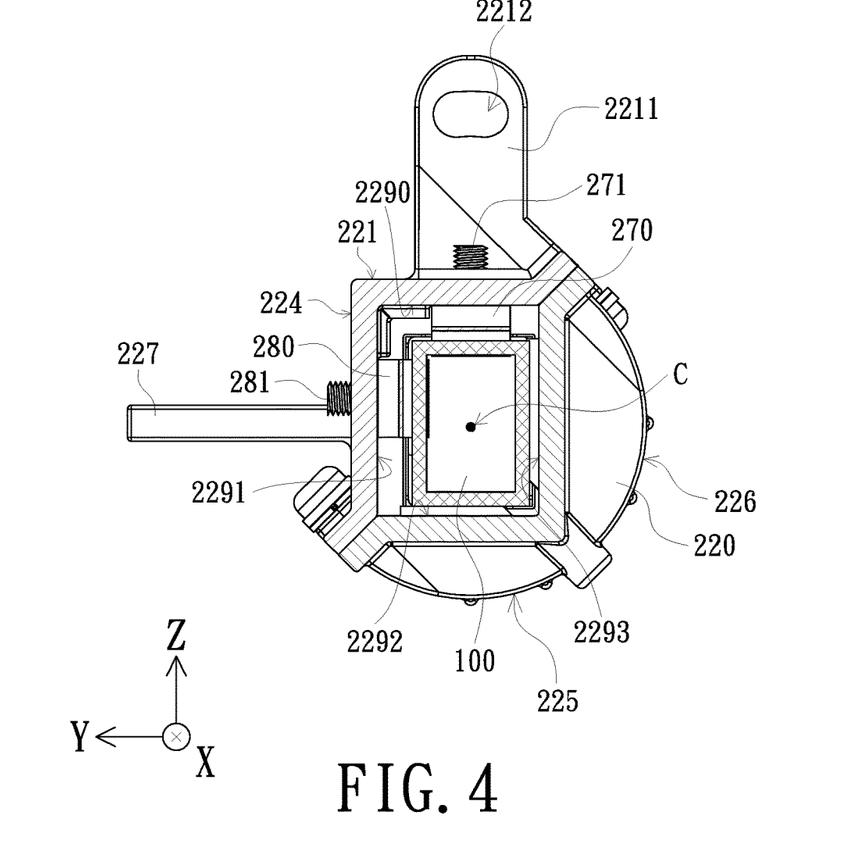
FIG. 4 is a schematic cross-sectional view of an YZ plane of an inner cylinder member and the light integration rod of FIG. 2.

In addition to adjusting the focal length of the light spot, the adjustment mechanism 200 of the embodiment may further include a function of rotating the light integration rod 100 to adjust the angle of the light spot as needed, as will be described in detail below. FIG. 4 is a schematic cross-sectional view of an YZ plane of an inner cylinder member and the light integration rod of FIG. 2. Referring to FIG. 2 to FIG. 4, the inner cylinder member 220 further has, for example, a second outer surface 224, a third outer surface 225, and a fourth outer surface 226. The second outer surface 224 and the fourth outer surface 226 are respectively connected between the first outer surface 221 and the third outer surface 225. The third outer surface 225 is opposite to the first outer surface 221, and the fourth outer surface 226 is opposite to the second outer surface 224. The third outer surface 225 and the fourth outer surface 226 are, for example, curved surfaces, but the shape of the first outer surface 221, the second outer surface 224, the third outer surface 225, and the fourth outer surface 226 is not particularly limited by the invention. The cylinder wall 213 of the outer cylinder member 210 further has, for example, a second opening 2133 and a second locking portion 2134 protruding outward. The second opening 2133 and the second locking portion 2134 are arranged, for example, around a center of the light integration rod 100 accommodated in the inner cylinder member 220. One of the second outer surface 224, the third outer surface 225, and the fourth outer surface 226 has a second protruding portion 227 that passes through the second opening 2133 and protrudes from the outer cylinder member 210, and opposites to the second locking portion 2134. The embodiment is exemplified by the second outer surface 224 having the second protruding portion 227, but is not limited thereto.

In the embodiment, the adjustment mechanism 200 further includes, for example, a second adjustment member 240 connected to the second locking portion 2134 and the second protruding portion 227. The second adjustment member 240 is configured to rotate the inner cylinder member 220 within a predetermined angular range, for example, with the center C of the light integration rod 100 accommodated in the inner cylinder member 220 as an axis. There is, for example, a gap between the second opening 2133 and the second protruding portion 227, and the gap allows the second protruding portion 227 to rotate within a predetermined angular range with the center C of the light integration rod 100 as an axis. The predetermined angle range is, for example, within ±1°, ±2° or ±3°, but is not limited thereto.

The second adjustment member 240 includes, for example, an adjusting screw 241 and a spring 242, but is not limited thereto, the second protruding portion 227 includes, for example, an adjusting hole 2271, but is not limited thereto, and the second locking portion 2134 includes, for example, a screw hole 2136, but is not limited thereto. The spring 242 is sleeved on a rod portion 2411 of the adjusting screw 241. The rod portion 2411 passes through the adjusting hole 2271 of the second protruding portion 227 and is fixed to the screw hole 2136 of the second locking portion 2134. Specifically, the spring 242 surrounds the rod portion 2411 of the adjusting screw 241 and abuts between the second protruding portion 227 and the second locking portion 2134. Regarding the manner in which the second adjustment member 240 moves relative to the inner cylinder member 220, in the embodiment, the adjusting screw 241 can be rotated in a rotating direction (for example, clockwise direction) to cause the second protruding portion 227 to drive the inner cylinder member 220 to rotate with the center C of the light integration rod 100 accommodated in the inner cylinder member 220 as an axis toward the second locking portion 2134, and causes the spring 242 to be in a compressed state. Or, the adjusting screw 241 is rotated in another rotational direction (for example, counterclockwise direction) to gradually release the spring 242 in the compressed state, and the spring 242 pushes the second protruding portion 227 to cause the second protruding portion 227 to drive the inner cylinder member 220 to rotate in a direction away from the second lock portion 2134 with the center C of the light integration rod 100 as an axis.

Figure 5:
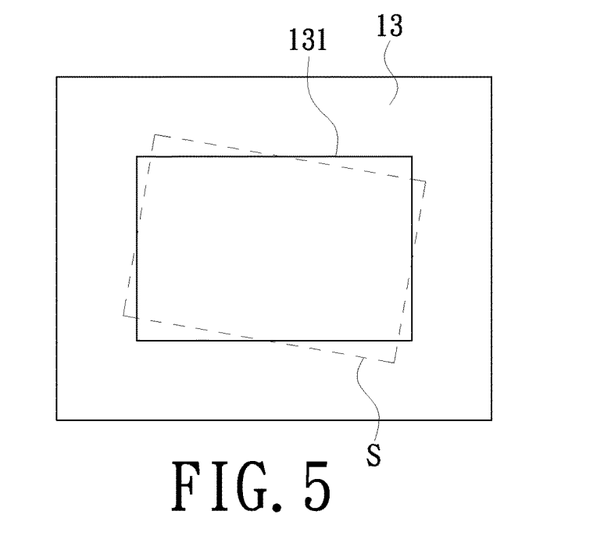
FIG. 5 is a schematic diagram of a light spot deflected in an active area of a light valve.

FIG. 5 is a schematic diagram of a light spot deflected in an active area of a light valve. Referring to FIG. 5, in the conventional projection device, due to the production tolerance, the angular deflection of the light spot S may be caused so that the light spot S cannot completely cover the active area 131 of the light valve 13. By adjusting the second adjustment member 240 of the adjustment mechanism 200 of the embodiment, the inner cylinder member 220 and the light integration rod 100 accommodated therein can be rotated with the center C of the light integration rod 100 as an axis, so that the light spot S formed on the active area of the light valve 13 can be rotated to solve the problem that the light spot S cannot completely cover the active area 131 due to the deflection of the light spot S on the active area 131 of the light valve 13, thereby enhancing light utilization efficiency.

In addition, when the second adjustment member 240 is adjusted, the gap of the first opening 2131 allows the first protruding portion 2211 to rotate with the center C of the light integration rod 100 as an axis. When the first adjustment member 230 is adjusted, the gap of the second opening 2133 also allows the second protruding portion 227 to move back and forth along the first direction A.

Figure 6:
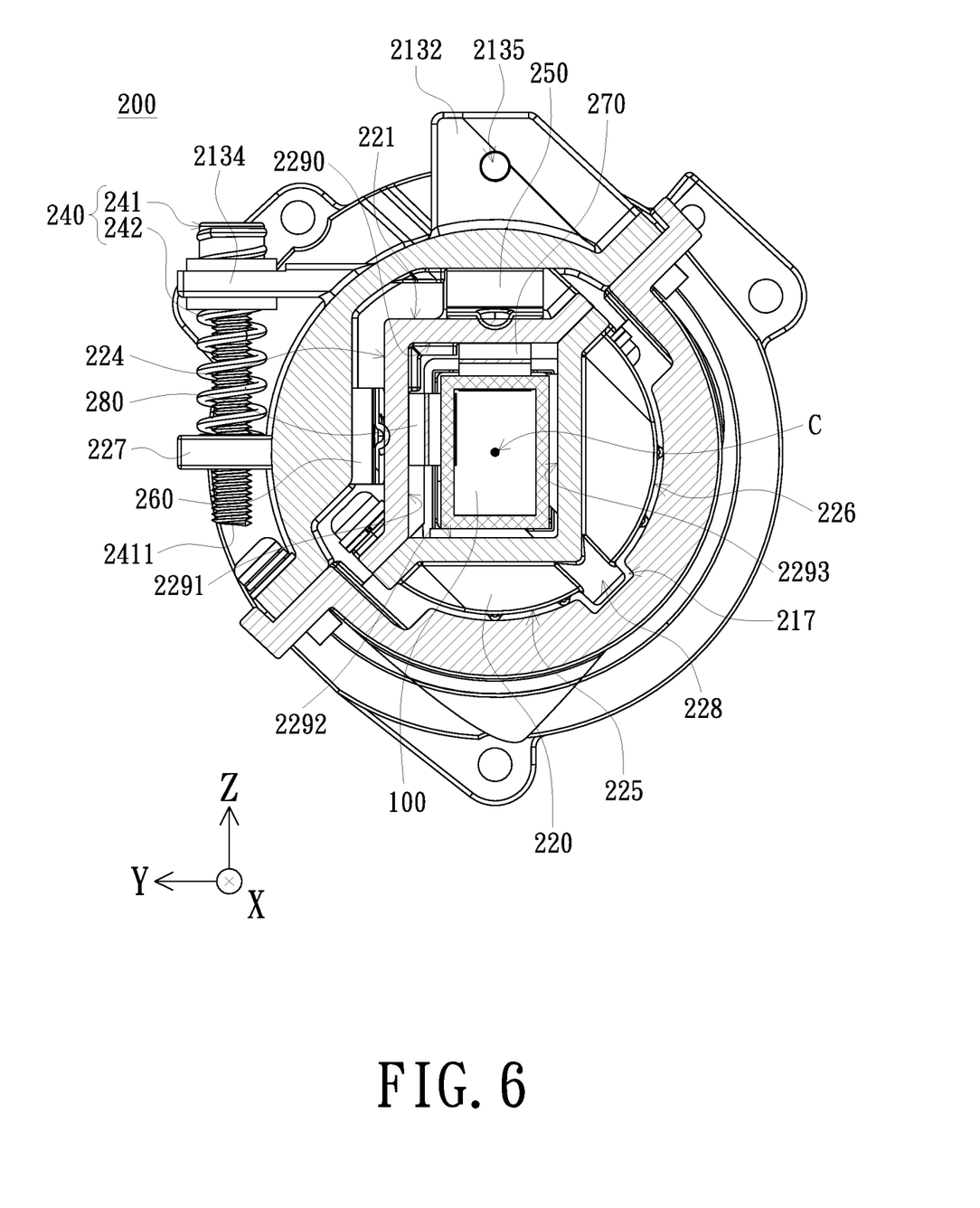
FIG. 6 is a schematic cross-sectional view of the YZ plane of the adjustment mechanism of FIG. 2.
Figure 7:
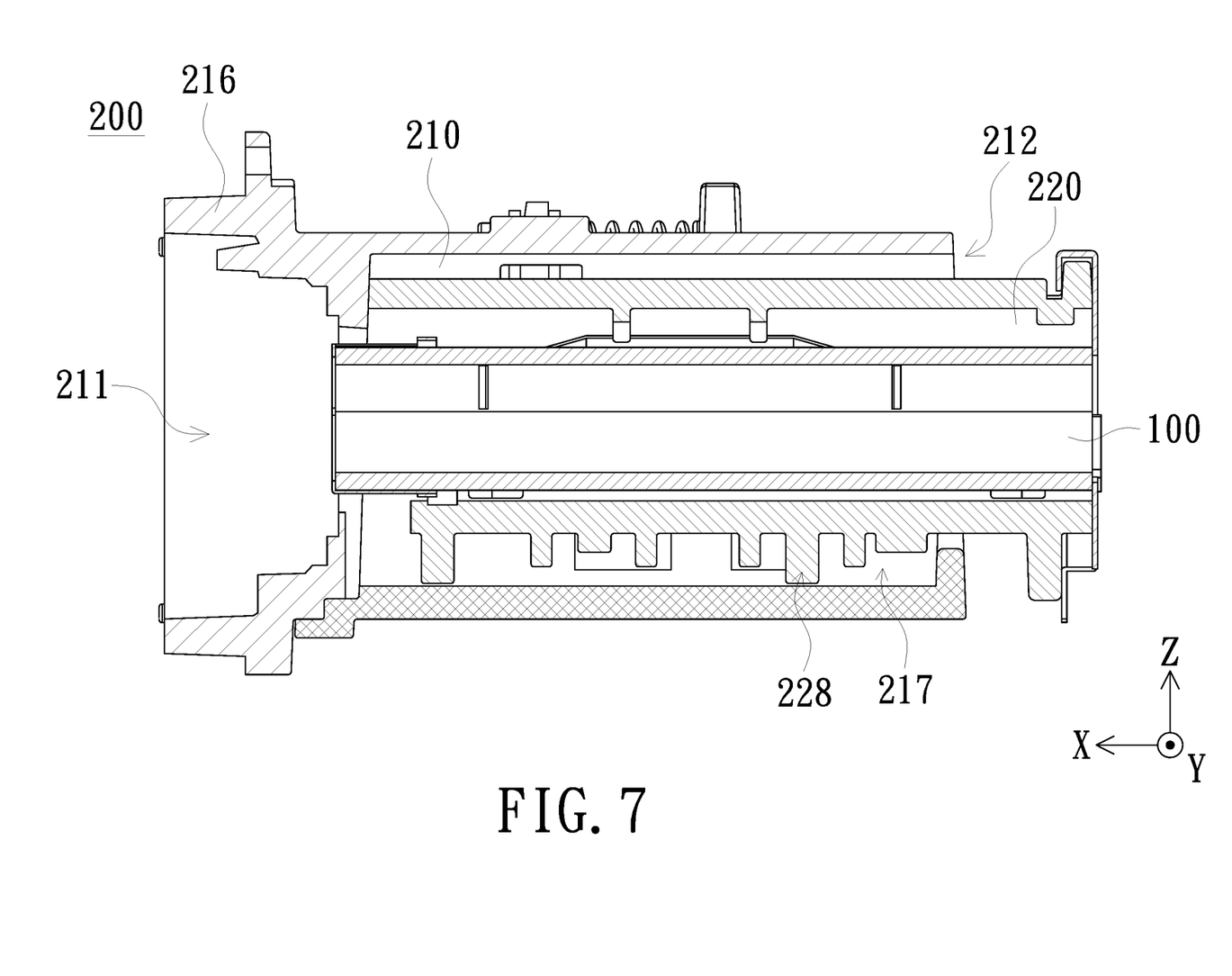
FIG. 7 is a schematic cross-sectional view of an XZ plane of the adjustment mechanism of FIG. 2.

FIG. 6 is a schematic cross-sectional view of the YZ plane of the adjustment mechanism of FIG. 2. FIG. 7 is a schematic cross-sectional view of an XZ plane of the adjustment mechanism of FIG. 2. Referring to FIG. 6 and FIG. 7, the inner side of the outer cylinder member 210 further includes, for example, a concave rail 217. An extending direction of the concave rail 217 is parallel to the first direction A. The inner cylinder member 220 has a plurality of protruding columns 228. In the embodiment, the plurality of protruding columns 228 are located between the third outer surface 225 and the fourth outer surface 226, but are not limited thereto. In addition, the quantity of the protruding columns 228 of FIG. 7 is exemplified by four, but the quantity of the protruding columns 228 is not particularly limited by the invention. The plurality of protruding columns 228 extend into the concave rail 217. By the cooperation of the concave rail 217 and the plurality of protruding columns 228, when the first adjustment member 230 is adjusted, the movement of the inner cylinder member 220 in the first direction A can be stabilized to prevent the center C of the light integration rod 100 from being shifted by the movement and unable to align the light path center, and then to prevent affecting light spot imaging and reducing light utilization efficiency.

In addition, in the embodiment, for example, there is a gap between each of the protruding columns 228 and the concave rail 217, so that when the second adjustment member 240 is adjusted, it can be prevented that the inner cylinder member 220 is unable to rotate within a predetermined angle range due to the protruding columns 228. In the embodiment in which the adjustment mechanism 200 does not have the function of rotating the light integration rod 100, the protruding columns 228 and the concave rail 217 may not have a gap therebetween.

Figure 8:
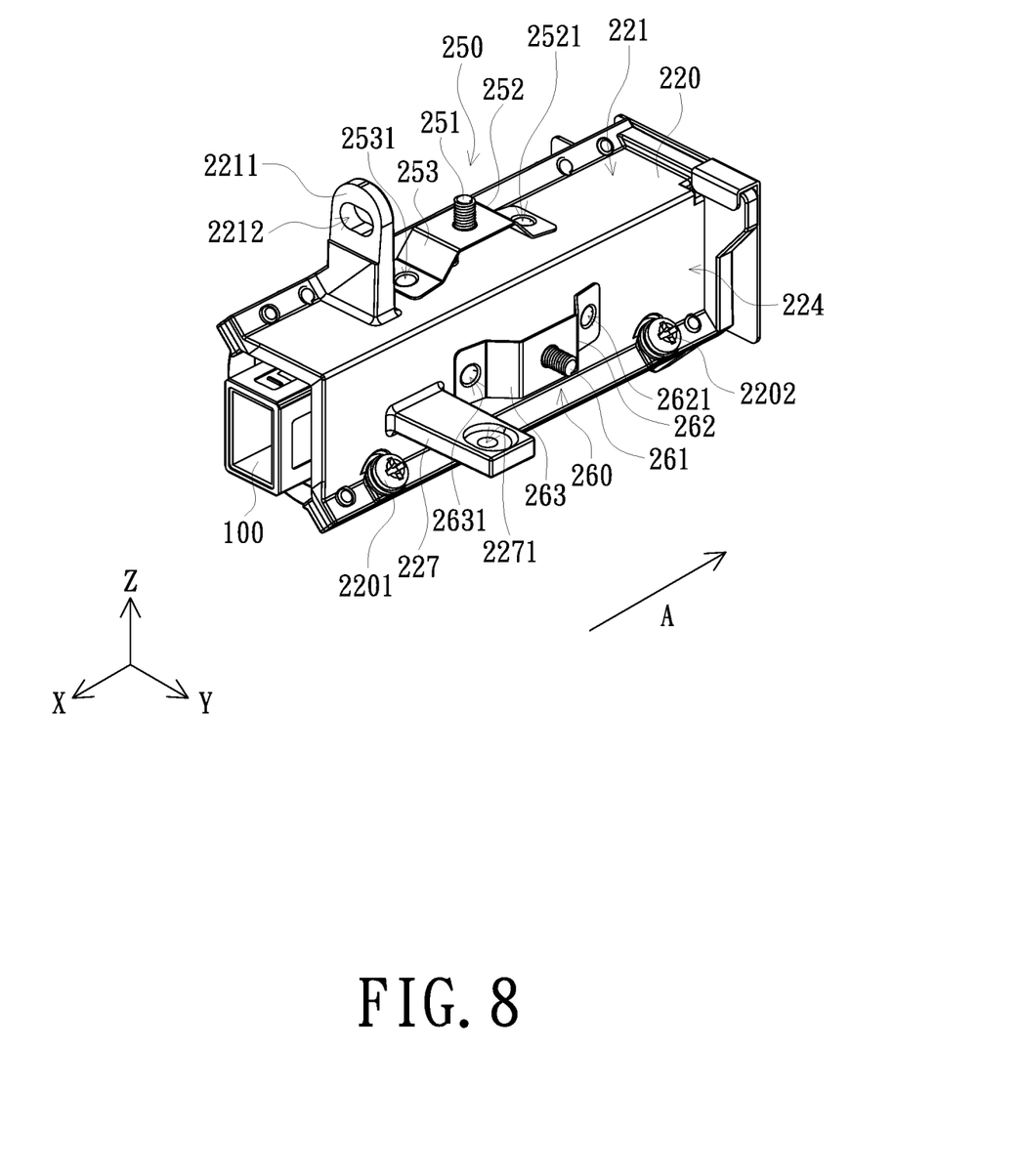
FIG. 8 is a schematic perspective view of a spring plate fixing the inner cylinder member of one embodiment of the invention.

FIG. 8 is a schematic perspective view of a spring plate fixing the inner cylinder member of one embodiment of the invention. Referring to FIG. 6 and FIG. 8, in order to securely fix the inner cylinder member 220 in the outer cylinder member 210, the adjustment mechanism 200 further includes, for example, at least two spring plates. In the embodiment, two spring plates 250 and 260 are taken as an example. The spring plates 250 and 260 are, for example, respectively fixed to the inner side of the outer cylinder member 210 by the locking screws 251 and 261. In addition, the at least two spring plates are at least respectively opposite to any adjacent two of the first outer surface 221, the second outer surface 224, the third outer surface 225 and the fourth outer surface 226 of the inner cylinder member 220. In the embodiment, the two spring plates 250 and 260 are, for example, respectively opposed to the first outer surface 221 and the second outer surface 224, but are not limited thereto. Two sides of each of the spring plates 250 and 260 are bent toward the inner cylinder member 220 to form two abutting portions (the spring plate 250 forms abutting portions 252, 253, and the spring plate 260 forms abutting portions 262, 263), and each of the abutting portions 252, 253, 262 and 263 respectively has, for example, a protrusion protruding toward the inner cylinder member 220 (the abutting portions 252, 253 form the protrusions 2521, 2531, and the abutting portions 262, 263 form the protrusions 2621, 2631), and each of the protrusions 2521, 2531, 2621, and 2631 abuts against the inner cylinder member 220 in a point contact manner. Thus, when the adjustment is performed by the second adjustment member 240, it is ensured that the inner cylinder member 220 can be smoothly rotated. However, the invention does not particularly limit the way to fix the inner cylinder member 220. In the embodiments where the adjustment mechanism 200 does not have the function of rotating the light integration rod 100, the abutting portions 252, 253, 262, 263 can be designed to abut against the inner cylinder member 220 in a line contact manner.

Figure 9:
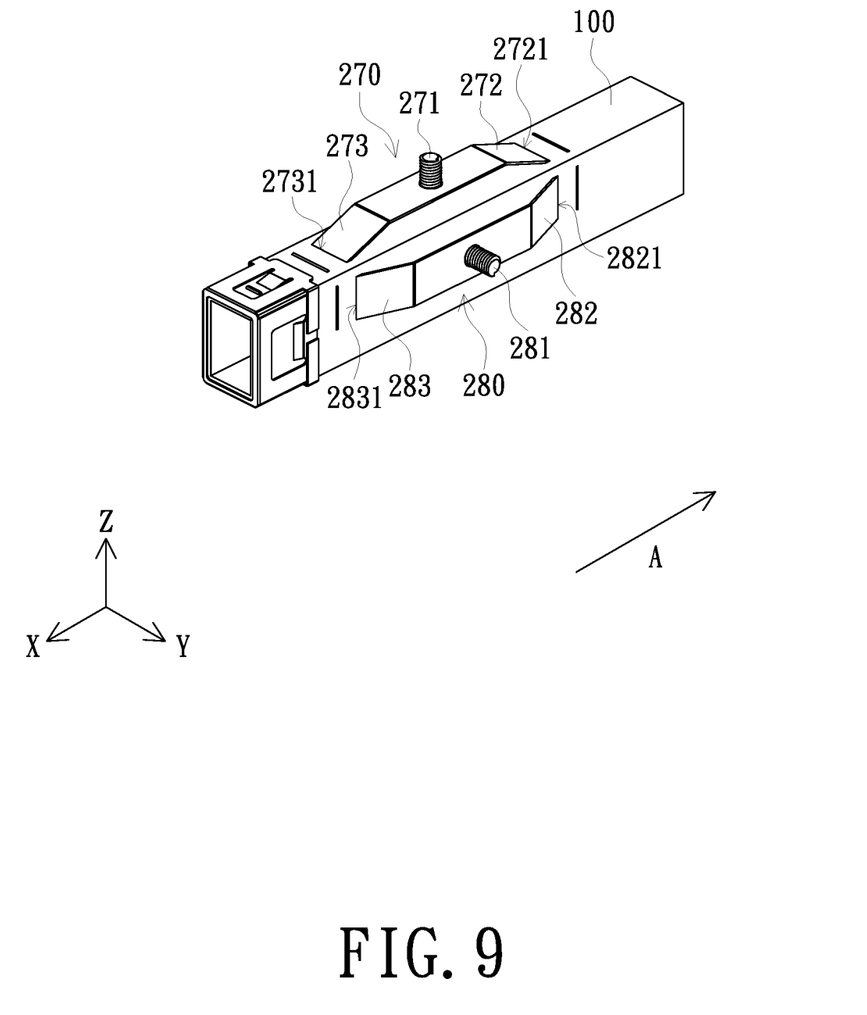
FIG. 9 is a schematic perspective view of a spring plate fixing the light integration rod of one embodiment of the invention.

FIG. 9 is a schematic perspective view of a spring plate fixing the light integration rod of one embodiment of the invention. Referring to FIG. 4, FIG. 6 and FIG. 9, the adjustment mechanism 200 further includes, for example, at least two spring plates. In the embodiment, two spring plates 270 and 280 are taken as an example. The inner cylinder member 220 has a first inner surface 2290, a second inner surface 2291, a third inner surface 2292 and a fourth inner surface 2293, in which the second inner surface 2291 and the fourth inner surface 2293 are respectively connected between the first inner surface 2290 and the third inner surface 2292. The third inner surface 2292 is opposite to the first inner surface 2290, and the fourth inner surface 2293 is opposite to the second inner surface 2291. The at least two spring plates are at least respectively fixed to any adjacent two of the first inner surface 2290, the second inner surface 2291, the third inner surface 2292 and the fourth inner surface 2293 of the inner cylinder member 220 by the locking screws 271 and 281. In the embodiment, the two spring plates 270 and 280 are, for example, respectively opposed to the first inner surface 2290 and the second inner surface 2291, but are not limited thereto. In the embodiment which the adjustment mechanism 200 includes the at least two spring plates 250, 260 that fix the inner cylinder member 220 and the at least two spring plates 270, 280 that fix the light integration rod 100, the positions of the at least two spring plates 250, 260 which fix the inner cylinder member 220 may or may not correspond to the at least two spring plates 270, 280 which fix the light integration rod 100. Two sides of each of the spring plates 270 and 280 are bent toward the light integration rod 100 to form two abutting portions (the spring plate 270 forms the abutting portions 272 and 273, and the spring plate 280 forms the abutting portions 282 and 283), and each of the abutting portions 272, 273, 282, and 283 has a contact edge (the abutting portions 272, 273 form the contact edges 2721, 2731, and the abutting portions 282, 283 form the contact edges 2821, 2831), and each of the contact edges 2721, 2731 2821, 2831 abuts against the light integration rod 100 in a line contact manner. However, the invention does not particularly limit the way to fix the light integration rod 100.

In summary, the inner cylinder member of the projection device and the adjustment mechanism of the embodiment of the invention is configured to accommodate the light integration rod and disposed in the outer cylinder member. By adjusting the first adjustment member connecting the first locking portion of the outer cylinder member and the first protruding portion of the inner cylinder member, the inner cylinder member and the light integration rod accommodated therein can move back and forth along the first direction from the first open end to the second open end of the outer cylinder member, so that the light spot can be focused on the active area of the light valve to reduce the problem of blurring of the edge of the light spot, thereby enhancing light utilization efficiency. In addition, by adjusting the second adjustment member connecting the second locking portion of the outer cylinder member and the second protruding portion of the inner cylinder member, the inner cylinder member and the light integration rod accommodated therein can be rotated with the center of the light integration rod as an axis, so that the light spot formed on the active area of the light valve can be rotated to solve the problem that the light spot cannot completely cover the active area due to the deflection of the light spot on the active area of the light valve, thereby enhancing light utilization efficiency.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first adjustment member, the second adjustment member, the first open end, the second open end, the first opening, the second opening, the first locking portion, the second locking portion, the first direction, the first protruding portion, the second protruding portion, the first outer surface, the second outer surface, the third outer surface, the fourth outer surface, the first inner surface, the second inner surface, the third inner surface and the fourth inner surface are only used for distinguishing various elements and do not limit the number of the elements.

What is claimed is:

1. An adjustment mechanism, configured to fix and adjust a light integration rod, comprising:
    an outer cylinder member, having a first open end, a second open end opposite to the first open end and a cylinder wall extending between the first open end and the second open end, wherein the cylinder wall has a first opening and a first locking portion protruding outward, the first locking portion and the first opening are arranged in a first direction from the first opening end to the second opening end;
    an inner cylinder member, configured to accommodate the light integration rod, wherein the inner cylinder member is disposed in the outer cylinder member, a first outer surface of the inner cylinder member has a first protruding portion, the first protruding portion passes through the first opening and protrudes from the outer cylinder member, and is opposite to the first locking portion; and
    a first adjustment member connected to the first locking portion and the first protruding portion, and configured to move the inner cylinder member back and forth along the first direction.

2. The adjustment mechanism according to claim 1, wherein the inner cylinder member further has a second outer surface, a third outer surface, and a fourth outer surface, the second outer surface and the fourth outer surface are respectively connected between the first outer surface and the third outer surface, the third outer surface is opposite to the first outer surface, and the fourth outer surface is opposite to the second outer surface, the cylinder wall of the outer cylinder member further has a second opening and a second locking portion protruding outward, the second opening and the second locking portion are arranged around a center of the light integration rod accommodated in the inner cylinder member, one of the second outer surface, the third outer surface, and the fourth outer surface has a second protruding portion that passes through the second opening and protrudes from the outer cylinder member, and opposites to the second locking portion, the adjustment mechanism further comprises a second adjustment member connected to the second locking portion and the second protruding portion, the second adjustment member is configured to rotate the inner cylinder member within a predetermined angular range with the center of the light integration rod accommodated in the inner cylinder member as an axis.

3. The adjustment mechanism according to claim 2, wherein the outer cylinder member further comprises a concave rail, an extending direction of the concave rail is parallel to the first direction, the inner cylinder member has a plurality of protruding columns extending into the concave rail, there is a gap between each of the plurality of protruding columns and the concave rail, the gap allows each of the plurality of protruding columns to rotate within a predetermined angular range with the center of the light integration rod accommodated in the inner cylinder member as an axis.

4. The adjustment mechanism according to claim 2, further comprising at least two spring plates respectively fixed to an inner side of the outer cylinder member, wherein the at least two spring plates are at least respectively opposite to any adjacent two of the first outer surface, the second outer surface, the third outer surface and the fourth outer surface of the inner cylinder member, two sides of each of the at least two spring plates are bent toward the inner cylinder member to form two abutting portions, and each of the two abutting portions respectively has a protrusion protruding toward the inner cylinder member, and each of the protrusion abuts against the inner cylinder member in a point contact manner.

5. The adjustment mechanism according to claim 2, further comprising at least two spring plates, wherein the inner cylinder member has a first inner surface, a second inner surface, a third inner surface and a fourth inner surface, the second inner surface and the fourth inner surface are respectively connected between the first inner surface and the third inner surface, the third inner surface is opposite to the first inner surface, the fourth inner surface is opposite to the second inner surface, the at least two spring plates are at least respectively fixed to any adjacent two of the first inner surface, the second inner surface, the third inner surface and the fourth inner surface of the inner cylinder member, two sides of each of the at least two spring plates are bent toward the light integration rod to form two abutting portions, each of the two abutting portions has a contact edge, and each of the contact edge abuts against the light integration rod in a line contact manner.

6. The adjustment mechanism according to claim 2, wherein the second adjustment member comprises an adjusting screw and a spring, the spring is sleeved on a rod portion of the adjusting screw, the rod portion is fixed to the second protruding portion and the second locking portion, and the spring surrounds the rod portion of the adjusting screw.

7. The adjustment mechanism according to claim 1, wherein the first adjustment member comprises an adjusting screw and a spring, the spring is sleeved on a rod portion of the adjusting screw, the rod portion is fixed to the first protruding portion and the first locking portion, and the spring surrounds the rod portion of the adjusting screw.

8. A projection device, comprising a light integration rod module, a light source, a light valve and a projection lens, wherein:
the light integration rod module comprises a light integration rod and an adjustment mechanism configured to fix and adjust the light integration rod, the adjustment mechanism comprises an outer cylinder member, an inner cylinder member and a first adjustment member, in which:
the outer cylinder member has a first open end and a second open end opposite to the first open end and a cylinder wall extending between the first open end and the second open end, wherein the cylinder wall has a first opening and a first locking portion protruding outward, the first locking portion and the first opening are arranged in a first direction from the first opening end to the second opening end;
the inner cylinder member is configured to accommodate the light integration rod, wherein the inner cylinder member is disposed in the outer cylinder member, a first outer surface of the inner cylinder member has a first protruding portion, the first protruding portion passes through the first opening and protrudes from the outer cylinder member, and is opposite to the first locking portion; and
the first adjustment member is connected to the first locking portion and the first protruding portion, and configured to move the inner cylinder member back and forth along the first direction;
the light source is configured to provide an illumination light beam to pass through the light integration rod;
the light valve is disposed on the transmission path of the illumination light beam and is adapted to convert the illumination light beam into an image light beam; and
the projection lens is disposed on the transmission path of the image light beam and is configured to project the image light beam out of the projection device.

9. The projection device according to claim 8, wherein the inner cylinder member further has a second outer surface, a third outer surface, and a fourth outer surface, the second outer surface and the fourth outer surface are respectively connected between the first outer surface and the third outer surface, the third outer surface is opposite to the first outer surface, and the fourth outer surface is opposite to the second outer surface, the cylinder wall of the outer cylinder member further has a second opening and a second locking portion protruding outward, the second opening and the second locking portion are arranged around a center of the light integration rod accommodated in the inner cylinder member, one of the second outer surface, the third outer surface, and the fourth outer surface has a second protruding portion that passes through the second opening and protrudes from the outer cylinder member, and opposites to the second locking portion, the adjustment mechanism further comprises a second adjustment member connected to the second locking portion and the second protruding portion, the second adjustment member is configured to rotate the inner cylinder member within a predetermined angular range with the center of the light integration rod accommodated in the inner cylinder member as an axis.

10. The projection device according to claim 9, wherein the outer cylinder member further comprises a concave rail, an extending direction of the concave rail is parallel to the first direction, the inner cylinder member has a plurality of protruding columns extending into the concave rail, there is a gap between each of the plurality of protruding columns and the concave rail, the gap allows each of the plurality of protruding columns to rotate within a predetermined angular range with the center of the light integration rod accommodated in the inner cylinder member as an axis.

11. The projection device according to claim 9, further comprising at least two spring plates respectively fixed to an inner side of the outer cylinder member, wherein the at least two spring plates are at least respectively opposite to any adjacent two of the first outer surface, the second outer surface, the third outer surface and the fourth outer surface of the inner cylinder member, two sides of each of the at least two spring plates are bent toward the inner cylinder member to form two abutting portions, and each of the two abutting portions respectively has a protrusion protruding toward the inner cylinder member, and each of the protrusion abuts against the inner cylinder member in a point contact manner.

12. The projection device according to claim 9, further comprising at least two spring plates, wherein the inner cylinder member has a first inner surface, a second inner surface, a third inner surface and a fourth inner surface, the second inner surface and the fourth inner surface are respectively connected between the first inner surface and the third inner surface, the third inner surface is opposite to the first inner surface, the fourth inner surface is opposite to the second inner surface, the at least two spring plates are at least respectively fixed to any adjacent two of the first inner surface, the second inner surface, the third inner surface and the fourth inner surface of the inner cylinder member, two sides of each of the at least two spring plates are bent toward the light integration rod to form two abutting portions, each of the two abutting portions has a contact edge, and each of the contact edge abuts against the light integration rod in a line contact manner.

13. The projection device according to claim 9, wherein the second adjustment member comprises an adjusting screw and a spring, the spring is sleeved on a rod portion of the adjusting screw, the rod portion is fixed to the second protruding portion and the second locking portion, and the spring surrounds the rod portion of the adjusting screw.

14. The projection device according to claim 8, wherein the first adjustment member comprises an adjusting screw and a spring, the spring is sleeved on a rod portion of the adjusting screw, the rod portion is fixed to the first protruding portion and the first locking portion, and the spring surrounds the rod portion of the adjusting screw.

\* \* \* \* \*